(12) United States Patent
Morioka (10) Patent No.: US 8,676,006 B2
(45) Date of Patent: Mar. 18, 2014

(54) LENS ARRAY AND OPTICAL MODULE INCLUDING LENS ARRAY

(75) Inventor: Shimpei Morioka, Kawaguchi (JP)

(73) Assignee: Enplas Corporation, Saitama (JP)

( * ) Notice: Subject to any disclaimer, the term of this patent is extended or adjusted under 35 U.S.C. 154(b) by 420 days.

(21) Appl. No.: 13/177,307

(22) Filed: Jul. 6, 2011

(65) Prior Publication Data

US 2012/0008899 A1   Jan. 12, 2012

(30) Foreign Application Priority Data

Jul. 9, 2010   (JP) ................. 2010-157141

(51) Int. Cl.
*G02B 6/32*   (2006.01)
(52) U.S. Cl.
USPC ................. 385/33; 385/14; 385/47
(58) Field of Classification Search
USPC .......................... 385/33, 14, 37, 47
See application file for complete search history.

(56) References Cited

U.S. PATENT DOCUMENTS

| | | | |
|---|---|---|---|
| 6,888,988 B2 * | 5/2005 | Vancoille et al. | 385/47 |
| 2011/0097037 A1 * | 4/2011 | Kuznia et al. | 385/33 |

FOREIGN PATENT DOCUMENTS

JP   2006-344915 A   12/2006

* cited by examiner

*Primary Examiner* — Ryan Lepisto
*Assistant Examiner* — Erin Chiem
(74) *Attorney, Agent, or Firm* — DLA Piper LLP (US)

(57) ABSTRACT

A complete reflection surface is formed in a notched section. A transmittance surface, a transmittance surface, and a complete reflection surface are formed in a recess section. The complete reflection surface completely reflects each laser beam emitted from first lenses. The transmittance surface and the transmittance surface transmit the incident laser beam. The complete reflection surface completely reflects each laser beam emitted from third lenses. A main body of a lens array optically couples optical fibers and photoelectric conversion elements (light-emitting elements and light-receiving elements) without an optical path of the laser light and an optical path of the laser light intersecting.

9 Claims, 11 Drawing Sheets

LENS ARRAY AND OPTICAL MODULE INCLUDING LENS ARRAY

TECHNICAL FIELD

The present invention relates to a lens array and an optical module including the lens array. In particular, the present invention relates to a lens array suitable for performing multi-channel optical communication and an optical module including the lens array.

BACKGROUND ART

In recent years, the need for high-speed transmission of signals within a system device or between devices has been rapidly increasing, and the development of optical interconnection has become active. Optical interconnection is a general term for technology for converting electrical signals to optical signals and transmitting light including communication information over an optical fiber or the like.

In optical interconnection such as that described above, a connector in which a plurality of optical fibers are arranged in an array is connected to an optical module, and multi-channel optical communication is actualized.

In optical modules for multi-channel optical communication, a type of optical module is known in which, to achieve compactness, a plurality of photoelectric conversion elements (light-emitting elements and light-receiving elements) are arranged on a substrate in an array such as to have an optical axis in a normal line direction of the substrate surface, and a connector in which the same number of optical fibers as the number of photoelectric conversion elements are arranged in an array such as to have an optical axis in a direction perpendicular to the optical axis of the photoelectric conversion elements is attached to a lens array.

Furthermore, in recent years, to actualize faster signal transmission, a lens array to which a connector in which a plurality of optical fibers are arranged in an array of two rows is attached and actualizes multi-channel optical communication, and an optical module including the lens array have been developed (for example, FIG. 13A and FIG. 13B in Patent Literature 1).

In a lens array (optical member 22) in Patent Literature 1 (FIG. 13A and FIG. 13B), light emitted from each light-emitting element (VCSEL 30) enters from a first lens (collimate lens 70), and light is emitted from a second lens (condensing lens 75) towards an end surface of each optical fiber (10). In addition, in the lens array (optical member 22) in Patent Literature 1 (FIG. 13A and FIG. 13B), light emitted from each optical fiber (10) enters from a third lens (collimate lens 76) and light from a fourth lens (condensing lens 77) is emitted towards each light-receiving element (PD 32).

Patent Literature 1: Japanese Patent Laid-open Publication No. 2006-344915

DISCLOSURE OF INVENTION

Problem to be Solved by the Invention

However, in the technology disclosed in Patent Literature 1, because the optical path from the first lens to the second lens and the optical path from the third lens to the fourth lens intersect within the lens array, signals interfere with each other, thereby possibly causing interference and stray lights.

The present invention has been achieved in light of the above-described issues. An object of the present invention is to provide a lens array having a compact configuration and is capable of actualizing multi-channel optical communication with a connector in which a plurality of optical fibers are arranged in an array of two rows without causing interference or stray lights, and an optical module including the lens array.

Means for Solving Problem

A lens array of the present invention is a lens array that optically couples 2×n number of photoelectric conversion elements (n being the number of photoelectric conversion elements per row and more than one) arrayed in two rows on a substrate and having an optical axis in a normal line direction of a surface of the substrate, and end surfaces of 2×n number of optical fibers arrayed in two rows and having an optical axis in a direction perpendicular to the optical axis of the photoelectric conversion elements. The lens array includes: an n-number of first lenses provided in positions opposing the photoelectric conversion elements in a first row that is a row farther from the optical fibers; an n-number of second lenses provided in positions opposing the end surfaces of the optical fibers in a first row that is a row farther from the photoelectric conversion elements; an n-number of third lenses provided in positions opposing the photoelectric conversion elements in a second row that is a row closer to the optical fibers; an n-number of fourth lenses provided in positions opposing the end surfaces of the optical fibers in a second row that is a row closer to the photoelectric conversion elements; a first reflection surface that changes a traveling direction of light emitted from the photoelectric conversion elements in the first row or the end surfaces of the optical fibers in the first row and passing through a first optical path between the first lens and the second lens; and a second reflection surface that changes a traveling direction of light emitted from the photoelectric conversion elements in the second row or the end surfaces of the optical fibers in the second row and passing through a second optical path between the third lens and the fourth lens. The first reflection surface is provided in a position that does not interfere with the second optical path, and the second reflection surface is provided in a position that does not interfere with the first optical path.

In addition, a lens array of the present invention is a lens array that optically couples an n-number of photoelectric conversion elements (n being more than one) of a first row arrayed in a row on a first substrate and having an optical axis in a normal line direction of a surface of the first substrate, an n-number of photoelectric conversion elements of a second row arrayed in a row on a second substrate opposing the first substrate and having an optical axis in a normal line direction of a surface of the second substrate, and 2×n number of optical fibers arrayed in two rows and having an optical axis in a direction perpendicular to the optical axis of the photoelectric conversion elements. The lens array includes: an n-number of first lenses provided in positions opposing the photoelectric conversion elements of the first row; an n-number of second lenses provided in positions opposing end surfaces of the optical fibers in a first row that is a row closer to the photoelectric conversion elements of the first row; an n-number of third lenses provided in positions opposing the photoelectric conversion elements of the second row; an n-number of fourth lenses provided in positions opposing end surfaces of the optical fibers in a second row that is a row closer to the photoelectric conversion elements of the second row; a first reflection surface that changes a traveling direction of light emitted from the photoelectric conversion elements of the first row or the end surfaces of the optical fibers in the first row and passing through a first optical path between the first lens and the second lens; and a second reflection surface that changes a traveling direction of light emitted from the photoelectric conversion elements of the second row or the end surfaces of the optical fibers in the second row and passing through a second optical path between the third lens and the fourth lens. The first reflection surface is provided in a position that does not interfere with the second optical path, and the second reflection surface is provided in a position that does not interfere with the first optical path.

Effect of the Invention

In the present invention, 2×n number of photoelectric conversion elements and end surfaces of 2×n number of optical fibers of which an optical axis is perpendicular to that of the photoelectric conversion elements can be optically coupled without a first optical path and a second optical path intersecting. Therefore, multi-channel optical communication with a connector in which a plurality of optical fibers are arranged in an array of two rows can be actualized without causing interference, using a compact configuration.

EXPLANATIONS OF LETTERS OR NUMERALS

Best Mode(s) for Carrying Out the Invention

Embodiments of the present invention will hereinafter be described with reference to the drawings. According to each embodiment, 24-core (12 cores×2 rows), multi-channel, bi-directional communication is described as an example.

First Embodiment

[Configuration of Optical Module]

Figure 1:
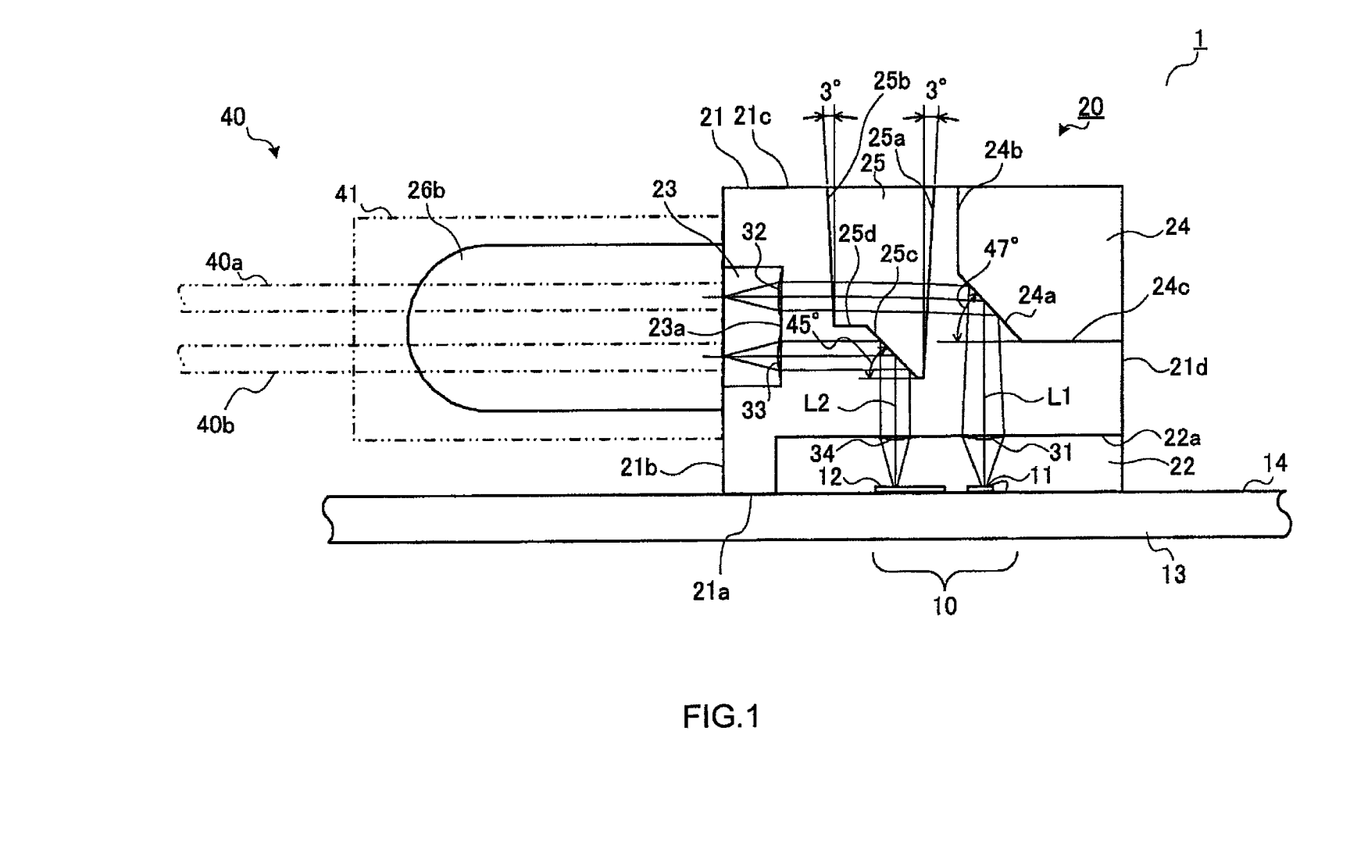
FIG. 1 is an overall configuration diagram of an overview of an optical module according to a first embodiment of the present invention, in addition to a vertical cross-sectional view of a side surface of a lens array.
Figures 2A, 2C:
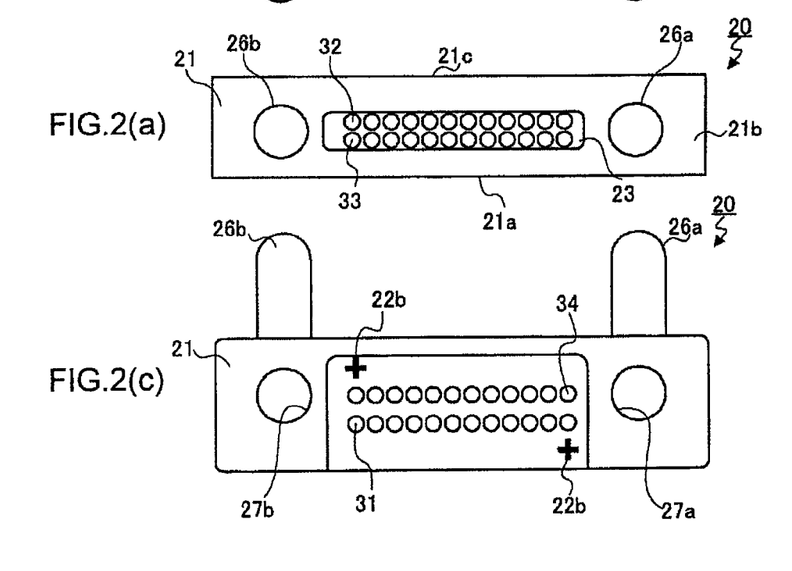
FIG. 2A, FIG. 2B, FIG. 2C, and FIG. 2D are diagrams of the lens array shown in FIG. 1.
Figure 2B:
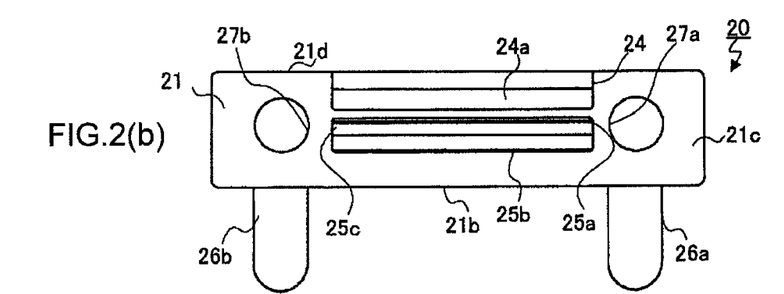
Figure 2D:
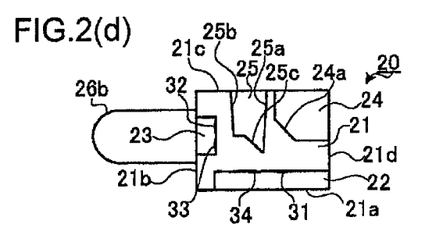

FIG. 1 is an overall configuration diagram of an overview of an optical module according to a first embodiment of the present invention, in addition to a vertical cross-sectional view of a side surface of a lens array. FIG. 2A, FIG. 2B, FIG. 2C, and FIG. 2D are diagrams of the lens array shown in FIG. 1. FIG. 2A is a front view of the lens array, FIG. 2B is a planar view of the lens array, FIG. 2C is a bottom view of the lens array, and FIG. 2D is a cross-sectional view of a right side surface of the lens array.

As shown in FIG. 1, an optical module 1 is mainly composed of a photoelectric conversion device 10, a lens array 20, and an optical fiber cable 40.

[Configuration of Photoelectric Conversion Device]

The photoelectric conversion device 10 performs conversion of optical signals to electrical signals, or electrical signals to optical signals. The photoelectric conversion device 10 includes a plurality (12) light-emitting elements (laser sources). 11 and a plurality (12) of light-receiving elements (photo detectors [PD]) 12. The light-emitting elements 11 and the light-receiving elements 12 are each arranged on a semiconductor substrate 13 in an array, evenly spaced in a direction perpendicular to the surface of the paper on which FIG. 1 is printed. Vertical cavity surface emitting lasers (VCSEL) are used as the plurality of light-emitting elements 11.

Each light-emitting element 11 emits (generates) a laser beam L1 in a direction perpendicular to an attachment surface 14 of the semiconductor substrate 13 (upward direction in FIG. 1). Each light-receiving element 12 receives a laser beam L2 emitted from the lens array 20.

[Configuration of Lens Array]

The lens array 20 optically couples each light-emitting element 11 and its corresponding optical fiber 40a, and optically couples each optical fiber 40b and its corresponding light-receiving element 12.

A main body 21 of the lens array 20 is almost a rectangular solid, composed of a resin material having light transmittance, such as polyetherimide (PEI), poly (methyl methacrylate) (PMMA), polycarbonate (PC), or epoxy resin (EP), or transparent glass.

In the lens array main body 21, a notched section 22 is formed in the center section of an outer peripheral surface 21a (lower end surface in FIG. 1) facing the photoelectric conversion device 10. The notched section 22 has a bottom surface 22a that is parallel with the outer peripheral surface 21a. In addition, in the lens array main body 21, a recess section 23 is formed in the center section of an outer peripheral surface 21b (left end surface in FIG. 1) perpendicular to the outer peripheral surface 21a and facing the end surfaces of the optical fibers 40a and 40b. The recess section 23 has a bottom surface 23a that is parallel with the outer peripheral surface 21b.

In the lens array main body 21, a notched section 24 is formed from an outer peripheral surface 21c (surface opposing the outer peripheral surface 21a; upper end surface in FIG. 1) to an outer peripheral surface 21d (surface opposing the outer peripheral surface 21b; right end surface in FIG. 1). In the lens array main body 21, a recess section 25 is also formed in the center section of the outer peripheral surface 21d.

In the lens array main body 21, two engaging pins (projecting sections) 26a and 26b are formed on both end sections of the outer peripheral surface 21b. A mechanically transferable splicing (MT) connector 41 is attached to the engaging pins 26a and 26b. The MT connector 41 is a multi-core bundle-type connector attached to the tip ends of the line centers of the 24 (2×12) optical fibers. According to the first embodiment, an optical transmitting body such as an optical waveguide may be attached instead of the MT connector including optical fibers.

In the lens array main body 21, two attachment holes 27a and 27b that pass through to the outer peripheral surface 21c are formed in both end sections of the outer peripheral surface 21a. The attachment holes 27a and 27b are used to attach the lens array main body 21 onto the attachment surface 14 of the semiconductor substrate 13.

The lens array 20 has a same number (12) of first lenses 31 (convex lenses) as the number of light-emitting elements 11 on the bottom surface 22a. The first lenses 31 are arranged in an array in positions opposing the light-emitting elements 11. The laser beam L1 emitted from the corresponding light-emitting element 11 enters the first lens 31. Then, the first lens 31 refracts the incident laser beam L1 into converged light, and sends the laser beam L1 into the lens array main body 21.

The lens array 20 also has a same number (12) of second lenses 32 (convex lenses) as the number of light-emitting elements 11 on the bottom surface 23a. The second lenses 32 are arranged in an array in positions opposing the end surfaces of the optical fibers 40a. The second lens 32 refracts the laser beam L1 that has entered the corresponding first lens 31 and traveled over an optical path within the lens array main body 21 to converge the laser beam L1 onto the end surface of the optical fiber 40a. The laser beam L1 is then emitted towards the end surface of the corresponding optical fiber 40a.

The lens array 20 also has a same number (12) of circular third lenses 33 (convex lenses) as the number of light-receiving elements 12 on the bottom surface 23a. The third lenses 33 are arranged in an array in positions opposing the end surfaces of the optical fibers 40b. A laser beam L2 emitted from the end surface of the corresponding optical fiber 40b enters the third lens 33. The third lens 33 then refracts the incident laser beam L2 into parallel light and sends the laser beam L2 into the lens array main body 21.

The lens array 20 also has a same number (12) of circular fourth lenses 34 (convex lenses) as the number of light-receiving elements 12. The fourth lenses 34 are arranged in an array in positions opposing the light-receiving elements 12. The fourth lens 34 refracts the laser beam L2 that has entered the corresponding third lens 33 and traveled over an optical path within the lens array main body 21 into converged light to be irradiated onto the light-receiving section of the light-receiving element 12, and emits the laser beam L2 towards the corresponding light-receiving element 12.

An alignment mark 22b used for positioning may be provided on the bottom surface 22a.

A flat complete reflection surface 24a is formed in the notched section 24. An angle of the complete reflection surface 24a is suitably set based on the material (refractive index) of the lens array 20. For example, when the lens array 20 is composed of PEI, the angle of the complete reflection surface 24a is 47° in the clockwise direction in FIG. 1 with the horizontal direction in FIG. 1 serving as reference (0°). The complete reflection surface 24a is provided in a position that does not interfere with the optical path of the laser beam L2, and completely reflects each laser beam L1 emitted from the first lenses 31. The complete reflection surface 24a may be coated with a reflective film composed of Au, Ag, Al or the like.

To form the complete reflection surface 24a, a flat surface 24b connecting the upper edge side of the complete reflection surface 24a and the outer peripheral surface 21c, and a flat surface 24c that connects the lower edge side of the complete reflection surface 24a and the outer peripheral surface 21d are formed in the notched section 24.

In the recess section 25, a flat transmittance surface 25a forming a portion of the side surface in the recess section 25, a flat transmittance surface 25b forming a portion of the side surface of the recess section 25, and a flat complete reflection surface 25c forming a portion of the bottom surface of the recess section 25 are formed.

In the recess section 25, a relief surface 25d is formed between the transmittance surface 25b and the complete reflection surface 25d such that the laser beam L1 that has passed through the transmittance surface 25a does not hit the complete reflection surface 25c.

The transmittance surface 25a is formed having an angle (about 3°) such that the upper edge side and the lower edge side in FIG. 1 are parallel to the array direction of the first lenses 31, and the upper edge side is positioned closer to the outer peripheral surface 21d side than the lower edge side. The transmittance surface 25a refracts and transmits each incident laser beam L1 in adherence to Snell laws of refraction.

The transmittance surface 25b is formed having an angle (about 3°) such that the upper edge side and the lower edge side in FIG. 1 are parallel to the array direction of the first lenses 31, and the upper edge side is positioned closer to the outer peripheral surface 21b side than the lower edge side. The transmittance surface 25b refracts and transmits each incident laser beam L1 in adherence to Snell laws of refraction.

When the horizontal direction in FIG. 1 serves as reference) (0°), the angle of the complete reflection surface 25c is 45° in the clockwise direction in FIG. 1. The complete reflection surface 25c is provided in a position that does not interfere with the optical path of the laser beam L1 and is closer to the third lens 33 and the fourth lens 34 than the complete reflection surface 24a. The complete reflection surface 25c completely reflects each laser beam L2 emitted from the third lenses 33. The complete reflection surface 25c may be coated with a reflective film composed of Au, Ag, Al or the like.

[Coupling of Lens Array and Semiconductor Substrate]

Figure 3A:
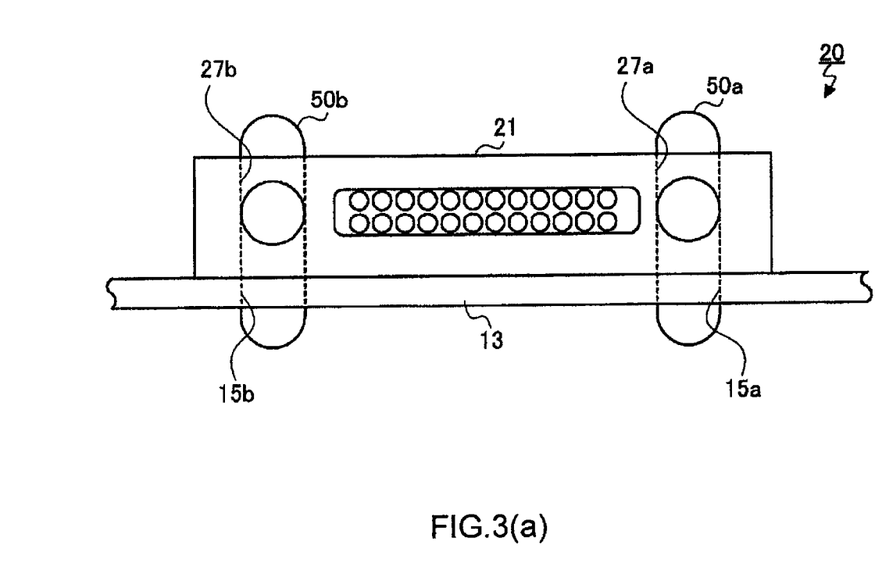
FIG. 3A and FIG. 3B are diagrams of a state in which the lens array and a semiconductor substrate in FIG. 1 are coupled.
Figure 3B:
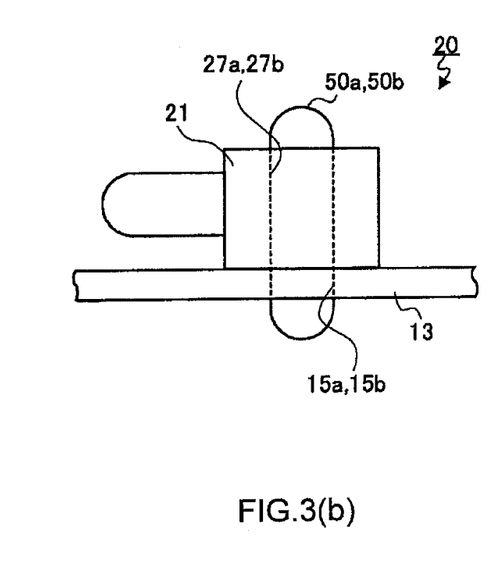

Next, coupling of the lens array 20 and the semiconductor substrate 13 will be described. FIG. 3A and FIG. 3B are diagrams of a state in which the lens array 20 and the semiconductor substrate 13 in FIG. 1 are coupled. FIG. 3A is a front view of the lens array 20 and the semiconductor substrate 13. FIG. 3B is a right side surface view of the lens array 20 and the semiconductor substrate 13.

Through holes 15a and 15b are provided in the semiconductor substrate 13. The inner diameters of the through holes 15a and 15b are almost the same as the inner diameters of the attachment holes 27a and 27b. The distance between the through hole 15a and the through hole 15b is the same as the distance between the attachment hole 27a and the attachment hole 27b.

To couple the lens array 20 and the semiconductor substrate 13, first, the lens array main body 21 is placed on the semiconductor substrate 13, and the positions of the attachment holes 27a and 27b, and the through holes 15a and 15b are aligned. Then, metal pins 50a and 50b are respectively inserted into the attachment hole 27a and the through hole 15a, and the attachment hole 27b and the through hole 15b.

The outer diameters of the metal pins 50a and 50b are slightly larger than the inner diameters of the attachment holes 27a and 27b and the inner diameters of the through holes 15a and 15b. Therefore, as a result of the metal pins 50a and 50b being inserted, the diameters of the attachment holes 27a and 27b, and the through holes 15a and 15b become slightly enlarged. Frictional force is generated between the metal pins 50a and 50b, and the attachment holes 27a and 27b and the through holes 15a and 15b, thereby preventing the metal pins 50a and 50b from falling out. As a result, the lens array 20 is fixed to the semiconductor substrate 13.

[Optical Path of Laser Beam]

The laser beam L1 emitted from each light-emitting element 11 enters the corresponding first lens 31 and is refracted by the first lens 31, thereby becoming converged light. The laser beam L1 emitted from the first lens 31 is then reflected by the complete reflection surface 24a such as to change direction in adherence to the angle of the complete reflection surface 24a, and passes through the transmittance surface 25a and the transmittance surface 25b. The laser beam L1 is then refracted by the corresponding second lens 32, thereby becoming converged light. The laser beam L1 emitted from the second lens 32 enters the end surface of the corresponding optical fiber 40a.

The laser beam L2 emitted from the end surface of each optical fiber 40b enters the corresponding third lens 33 and is refracted by the third lens 33, thereby becoming parallel light. The laser beam L2 emitted from the third lens 33 is then reflected by the complete reflection surface 25c such as to change direction to an almost right angle in adherence to the angle of the complete reflection surface 25c. The laser beam L2 is then refracted by the corresponding fourth lens 39, thereby becoming converged light. The laser beam L2 emitted from the fourth lens 34 enters the light-receiving surface of the corresponding light-receiving element 12. The optical axis of the laser beam L2 from the third lens 33 to the complete reflection surface 25c is almost parallel with the optical axis of the laser beam L1 from the complete reflection surface 24a to the second lens 32, and a constant distance is maintained therebetween. The optical axis of the laser beam L2 from the complete reflection surface 25c to the fourth lens 34 is almost parallel with the optical axis of the laser beam L1 from the first lens 31 to the complete reflection surface 24a, and a constant distance is maintained therebetween.

As described above, according to the first embodiment, the optical fibers and the photoelectric conversion elements (the light-emitting elements 11 and the light-receiving elements 12) are optically coupled by the lenses without the optical path of the laser beam L1 and the optical path of the laser beam L2 intersecting.

Effects and Variations according to the First Embodiment

As described above, according to the first embodiment, because the optical path of the laser beam L1 and the optical path of the laser beam L2 do not intersect, multi-channel optical communication can be actualized with a connector in which a plurality of optical fibers are arranged in an array of two rows without causing interference or stray lights, using a compact configuration.

According to the first embodiment, the transmittance surface 25a and the transmittance surface 25b are angled, and the recess section 25 is formed such that the cross-sectional area gradually decreases from the opening section towards the back. Therefore, the recess section 25 has a shape ensuring mold-release characteristics. As a result, the lens array 20 can be efficiently manufactured using a mold.

Figure 4:
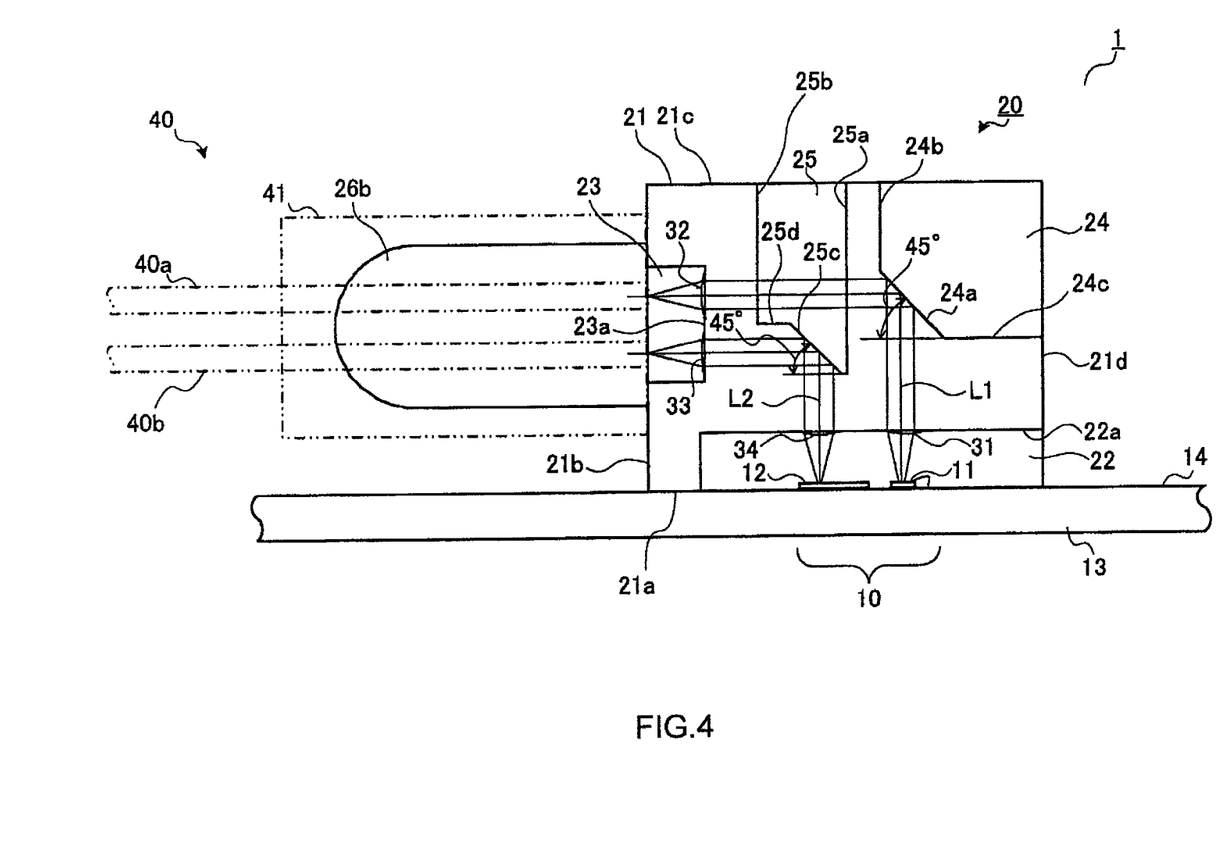
FIG. 4 is a diagram of a variation of the lens array according to the first embodiment of the present invention.

As shown in FIG. 4, when the transmittance surface 25a and the transmittance surface 25b are formed perpendicular to the outer peripheral surface 21c, refraction by the transmittance surface 25a and the transmittance surface 25b is eliminated. As a result, although mold-release characteristics of the recess section 25 becomes slightly poor, the angle of the complete reflection surface 29a is merely required to be set to 95° in the clockwise direction in FIG. 1 with the horizontal direction in FIG. 1 serving as reference (0°), without depending on the material (refractive index) of the lens array 20. Design and manufacture of the lens array 20 are facilitated. In this instance, each incident laser beam L1 is refracted by the first lens 31 to become parallel light and then sent into the lens array main body 21.

Figure 5:
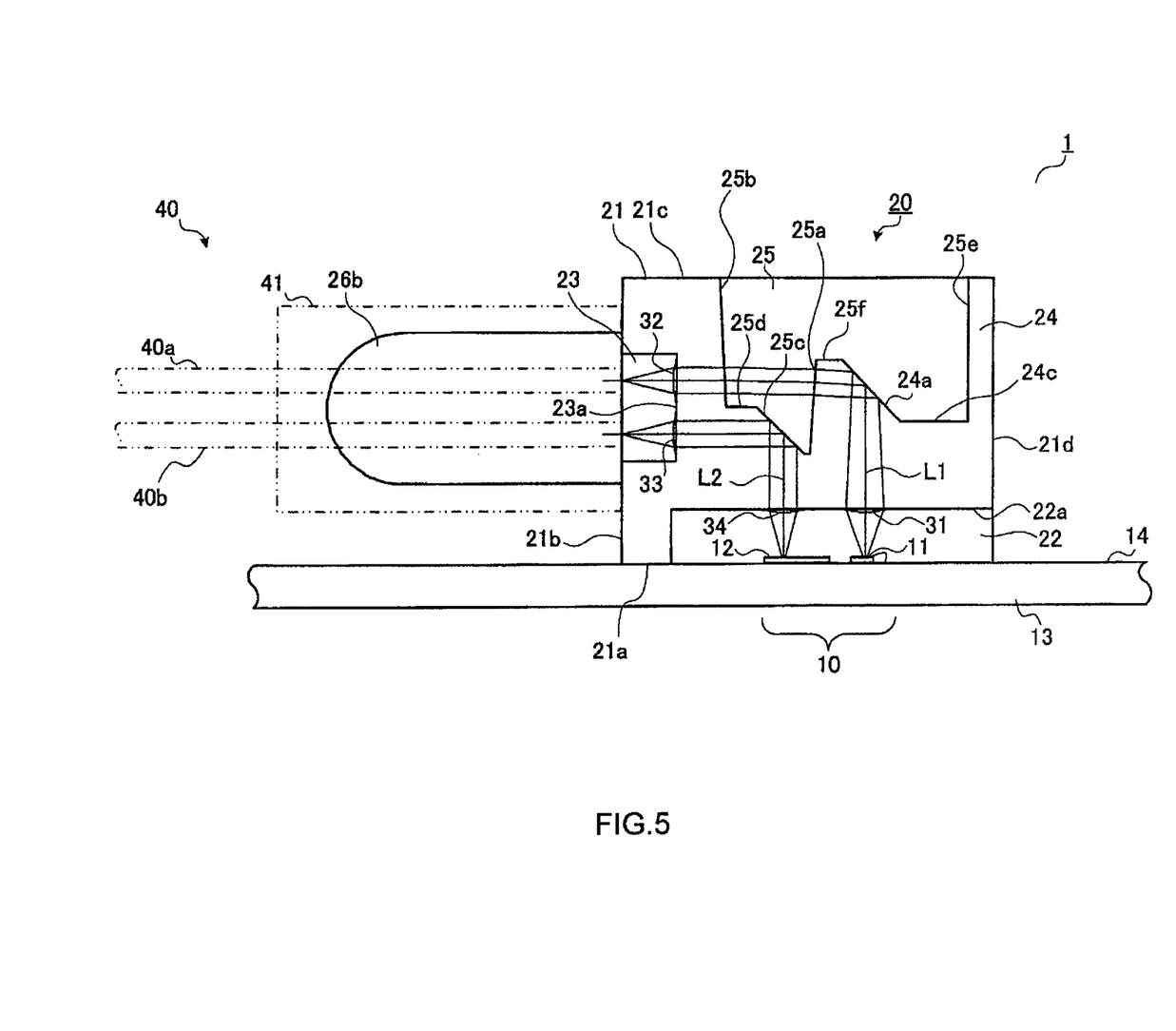
FIG. 5 is a diagram of a variation of the lens array according to the first embodiment of the present invention.

As shown in FIG. 5, according to the first embodiment, the notched section 24 may be eliminated, the shape of the recess section 25 may be changed, and the complete reflection surface 24a may be formed into a surface configuring the recess section 25. In FIG. 5, a flat surface 25e connecting the surface 24c and the outer peripheral surface 21c, and a flat surface 25f connecting the transmittance surface 25a and the complete reflection surface 24a are formed in the recess section 25.

Figure 6:
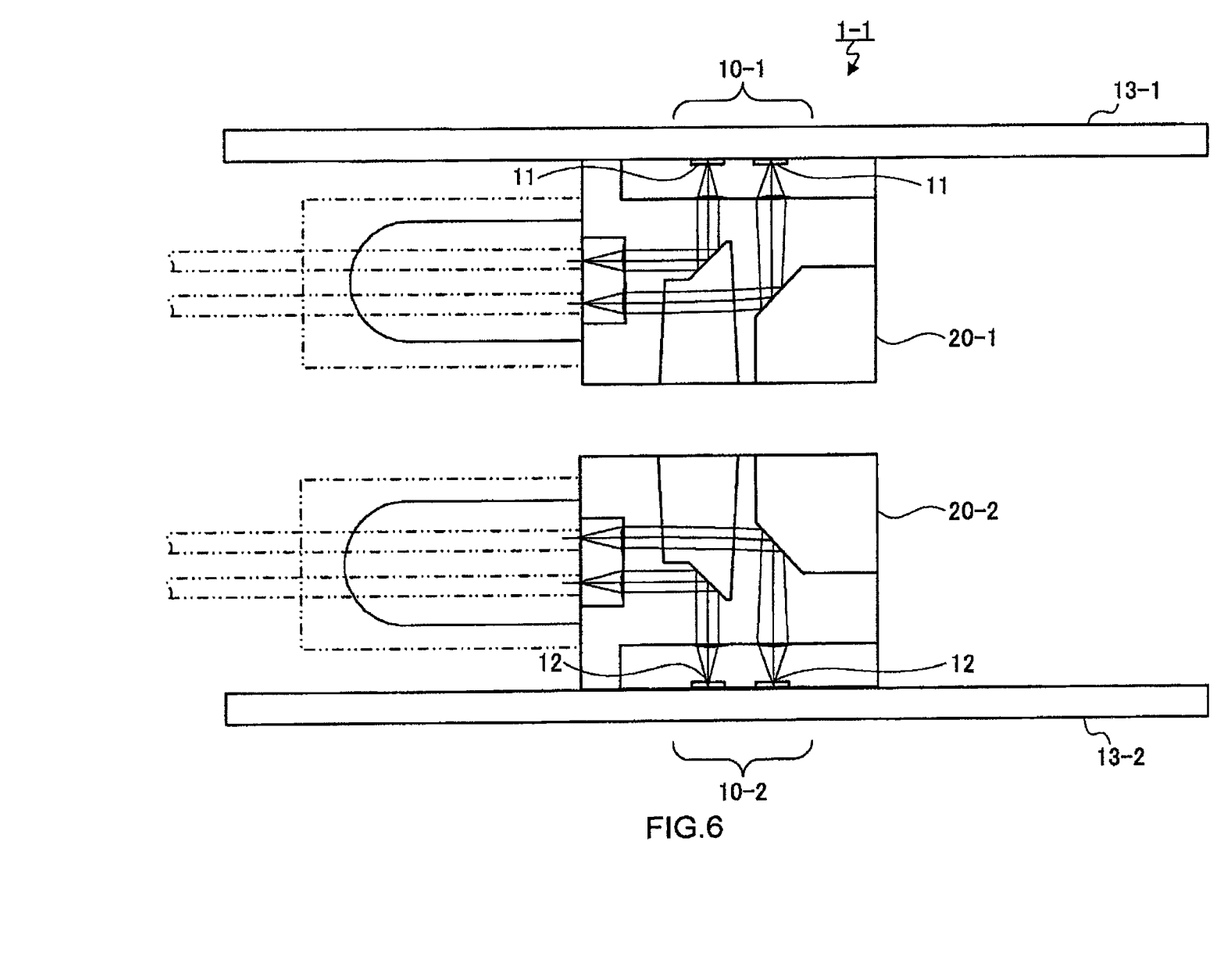
FIG. 6 is a diagram of a variation of the optical module according to the first embodiment of the present invention.

In the description above, an instance in which 12 of the 24 photoelectric conversion elements are light-emitting elements and 12 are light-receiving elements is described. However, the first embodiment is not limited thereto. For example, as shown in FIG. 6, 24 light-emitting elements 11 may be disposed on a transmitting-side semiconductor substrate 13-1 and a transmission-dedicated optical module 1-1 (a photoelectric conversion device 10-1 and a lens array 20-1) may be configured. In addition, 29 light-receiving elements 12 may be disposed on a receiving-side semiconductor substrate 13-2 and a reception-dedicated optical module 1-2 (a photoelectric conversion device 10-2 and a lens array 20-2) may be configured.

Figure 7A:
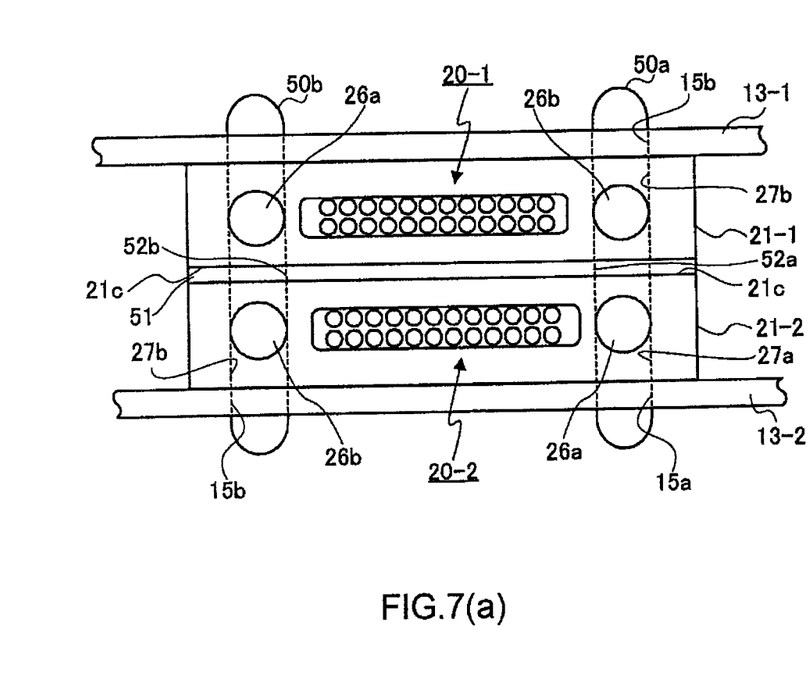
FIG. 7A and FIG. 7B are diagrams of a state in which the lens arrays and the semiconductor substrates in FIG. 6 are coupled.
Figure 7B:
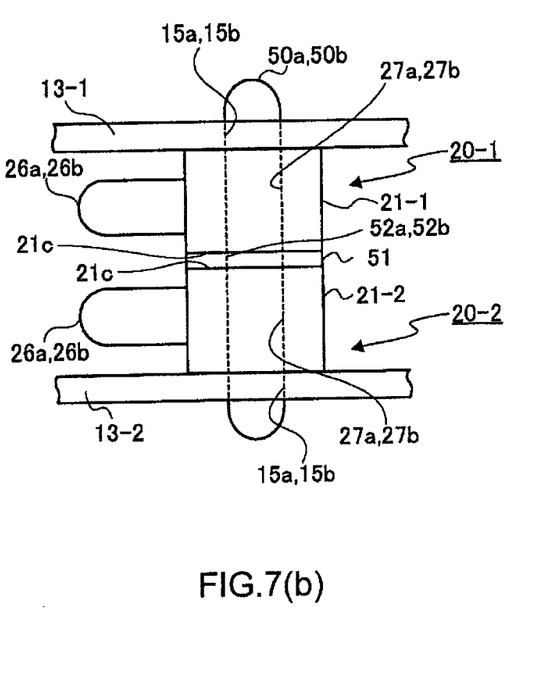

FIG. 7A and FIG. 7B are diagrams of a state in which the lens arrays 20-1 and 20-2 and the semiconductor substrates 13-1 and 13-2 in FIG. 6 are coupled. FIG. 7A is a front view of the lens arrays 20-1 and 20-2 and the semiconductor substrates 13-1 and 13-2. FIG. 7B is a right side surface view of the lens arrays 20-1 and 20-2 and the semiconductor substrates 13-1 and 13-2.

To couple the lens arrays 20-1 and 20-2 and the semiconductor substrates 13-1 and 13-2, first, a lens array main body 21-2, a spacer 51, a lens array main body 21-1, and the semiconductor substrate 13-1 are placed in sequence on the semiconductor substrate 13-2. At this time, the outer peripheral surface 21c of the lens array main body 21-2 and the outer peripheral surface 21c of the lens array main body 21-1 face each other. The engaging pins 26a and 26b of the lens array main body 21-1 and the lens array main body 21-2 face the same direction (the left side in FIG. 7B).

Then, the positions of the attachment holes 27a and 27b of the lens arrays 20-1 and 20-2 and the through holes 15a and 15b of the semiconductor substrates 13-1 and 13-2 are aligned, and the metal pins 50a and 50b are inserted.

Second Embodiment

[Configuration of Optical Module]

Figure 8:
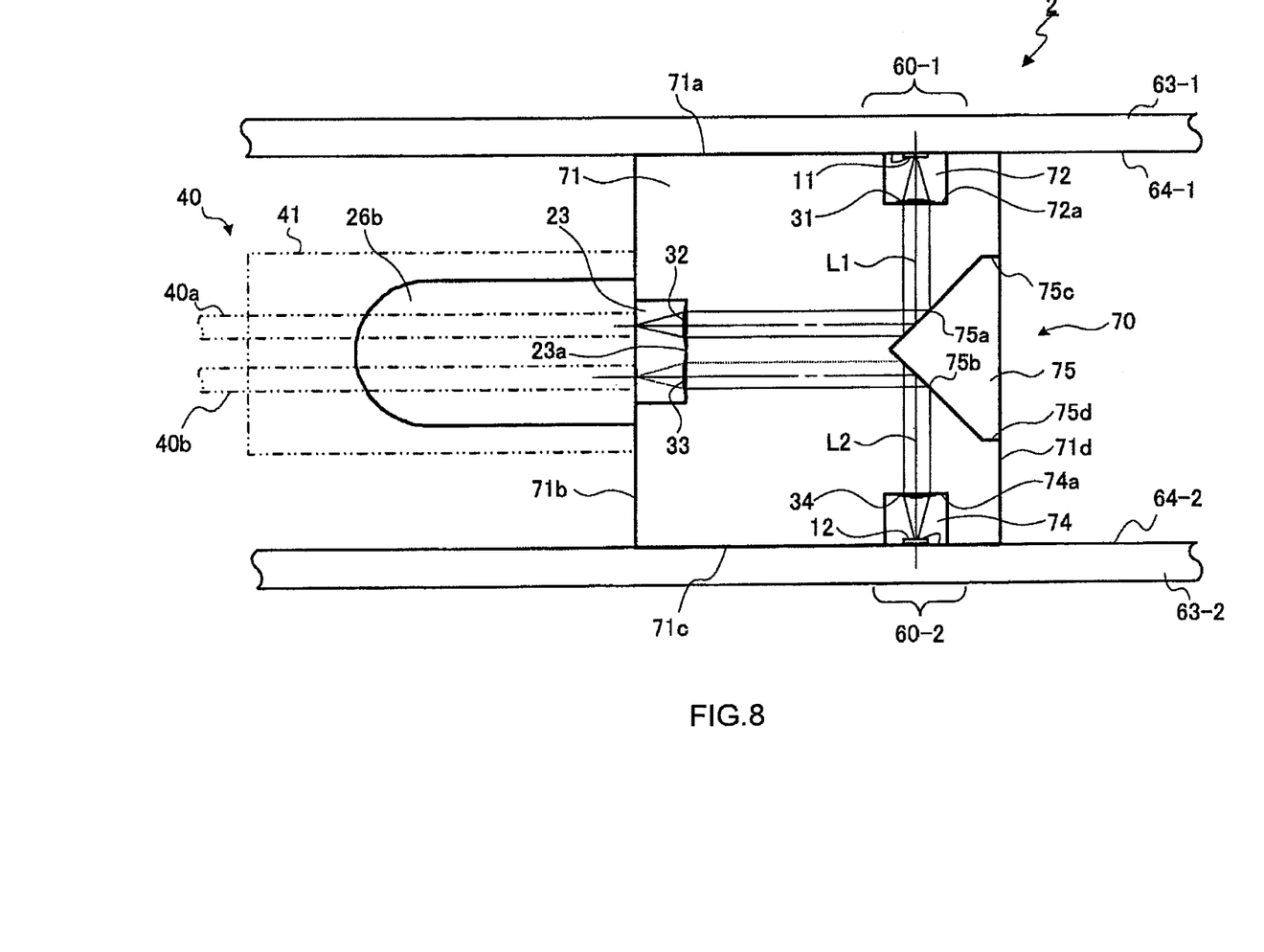
FIG. 8 is an overall configuration diagram of an overview of an optical module according to a second embodiment of the present invention, in addition to a vertical cross-sectional view of a side surface of a lens array.
Figure 9A:
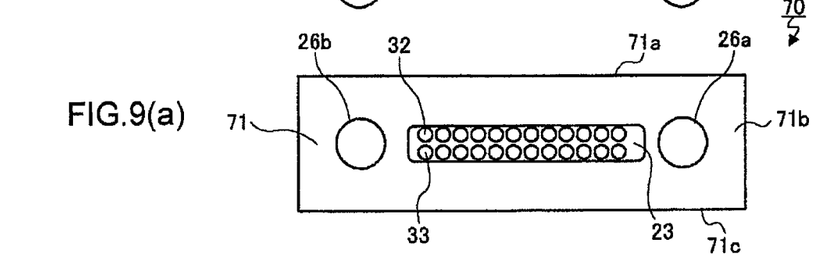
FIG. 9A, FIG. 9B, FIG. 9C, and FIG. 9D are diagrams of the lens array in FIG. 8.
Figure 9B:
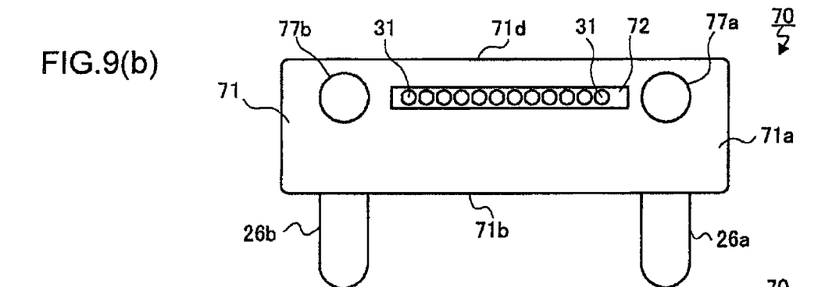
Figure 9C:
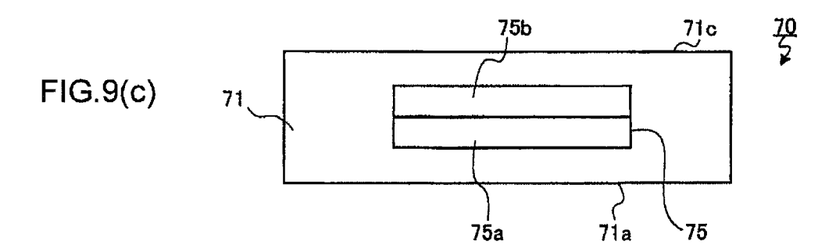
Figure 9D:
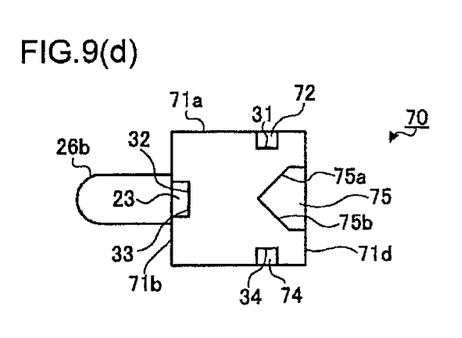

FIG. 8 is an overall configuration diagram of an overview of an optical module according to a second embodiment of the present invention, in addition to a vertical cross-sectional view of a side surface of a lens array. FIG. 9A, FIG. 9B, FIG. 9C, and FIG. 9D are diagrams of the lens array in FIG. 8. FIG. 9A is a front view of the lens array, FIG. 9B is a planar view of the lens array, FIG. 9C is a bottom view of the lens array, and FIG. 9D is a cross-sectional view of a right side surface of the lens array.

According to the second embodiment, constituent sections in FIG. 8 and FIG. 9A to FIG. 9D that are common with FIG.

1 and FIG. 2A to FIG. 2D are given the same reference numbers as those in FIG. 1 and FIG. 2A to FIG. 2D. Detailed descriptions thereof are omitted.

As shown in FIG. 8, an optical module 2 is mainly composed of photoelectric conversion devices 60-1 and 60-2, and a lens array 70.

[Configuration of Photoelectric Conversion Device]

The photoelectric conversion device 60-1 has a plurality (12) of light-emitting elements 11 and the photoelectric conversion device 60-2 has a plurality (12) of light-receiving elements 12. The light-emitting elements 11 are arranged in an array on a semiconductor substrate 63-1, evenly spaced in a direction perpendicular to the paper on which FIG. 8 is printed. In addition, the light-receiving elements 12 are arranged in an array on the semiconductor substrate 63-2, evenly spaced in the direction perpendicular to the paper on which FIG. 8 is printed.

Each light-emitting element 11 emits (generates) the laser beam L1 in a direction perpendicular to an attachment surface 64-1 of the semiconductor substrate 63-1 (upward direction in FIG. 8). Each light-receiving element 12 receives the laser beam L2 emitted from the lens array 70.

[Configuration of Lens Array]

The lens array 70 optically couples each light-emitting element 11 and the end surface of its corresponding optical fiber 40a, and optically couples each optical fiber 40b and the end surface of its corresponding light-receiving element 12.

A main body 71 of the lens array 70 is almost a rectangular solid, composed of a resin material having light transmittance, such as polyetherimide (PEI), poly(methyl methacrylate) (PMMA), polycarbonate (PC), or epoxy resin (EP), or transparent glass.

In the lens array main body 71, a recess section 72 is formed in the center section of an outer peripheral surface 71a (upper end surface in FIG. 8) facing the photoelectric conversion device 60-1. The recess section 72 has a bottom surface 72a that is parallel with the outer peripheral surface 71a. In addition, in the lens array main body 71, the recess section 23 is formed in the center section of an outer peripheral surface 71b (left end surface in FIG. 8) perpendicular to the outer peripheral surface 71a and facing the end surfaces of the optical fibers 40a and 40b, in a manner similar to that in the lens array main body 21 in FIG. 1. Furthermore, in the lens array main body 71, a recess section 74 is formed in the center section of an outer peripheral surface 71c (surface opposing the outer peripheral surface 71a; lower end surface in FIG. 8) facing the photoelectric conversion device 60-2. The recess section 74 has a bottom surface 74a that is parallel with the outer peripheral surface 71c.

In the lens array main body 71, a recess section 75 is also formed in the center section of an outer peripheral surface 71d (surface opposing the outer peripheral surface 71b; right end surface in FIG. 8).

In the lens array main body 71, the two engaging pins (projecting sections) 26a and 26b are formed on both end sections of the outer peripheral surface 71b in a manner similar to that in the lens array main body 21 in FIG. 1.

In the lens array main body 71, two attachment holes 77a and 77b that pass through to the outer peripheral surface 71c are formed in both end sections of the outer peripheral surface 71a. The attachment holes 77a and 77b are used to attach the lens array main body 71 onto the semiconductor substrates 63-1 and 63-2.

The lens array 70 has a same number (12) of first lenses 31 (convex lenses) as the number of light-emitting elements 11 on the bottom surface 72a. The first lenses 31 are arranged in an array in positions opposing the light-emitting elements 11.

The laser beam L1 emitted from the corresponding light-emitting element 11 enters the first lens 31. Then, the first lens 31 refracts the incident laser beam L1 into parallel light, and sends the laser beam L1 into the lens array main body 71.

The lens array 70 also has the second lenses 32 and the third lenses 33 on the bottom surface 23a in a manner similar to that in the lens array main body 21 in FIG. 1.

The lens array 20 also has a same number (12) of circular fourth lenses 32 (convex lenses) as the number of light-receiving elements 12 on the bottom surface 74a. The fourth lenses 34 are arranged in an array in positions opposing the light-receiving elements 12. The fourth lens 34 refracts the laser beam L2 that has entered the corresponding third lens 33 and traveled over an optical path within the lens array main body 71 into converged light to be irradiated onto the light-receiving section of the light-receiving element 12, and emits the laser beam L2 towards the corresponding light-receiving element 12.

Flat complete reflection surfaces 75a and 75b are formed in the recess section 75 such as to configure a portion of the bottom surface of the recess section 75. Flat surfaces 75c and 75d are also formed in the recess section 75 such as to configure the side surfaces of the recess section 75.

The angle of the complete reflection surface 75a is 45° in the counter-clockwise direction in FIG. 8 with the horizontal direction in FIG. 8 serving as reference (0°). The complete reflection surface 75a is provided in a position that does not interfere with the optical path of the laser beam L2, and completely reflects each laser beam L1 emitted from the first lenses 31. The complete reflection surface 75a may be coated with a reflective film composed of Au, Ag, Al or the like.

The angle of the complete reflection surface 75b is 45° in the clockwise direction in FIG. 8 with the horizontal direction in FIG. 8 serving as reference (0°). The complete reflection surface 75b is provided in a position that does not interfere with the optical path of the laser beam L1 and is closer to the third lens 33 and the fourth lens 34 than the complete reflection surface 75a. The complete reflection surface 75b completely reflects each laser beam L2 emitted from the third lenses 33. The complete reflection surface 75b may be coated with a reflective film composed of Au, Ag, Al or the like.

[Coupling of Lens Array and Semiconductor Substrate]

Figure 10A:
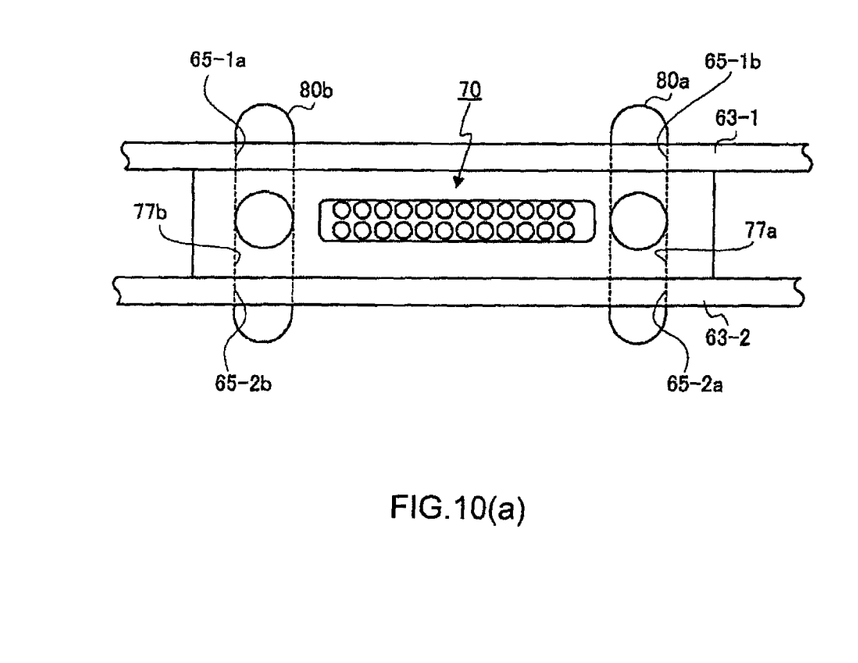
FIG. 10A and FIG. 10B are diagrams of a state in which the lens array and semiconductor substrates in FIG. 8 are coupled.
Figure 10B:
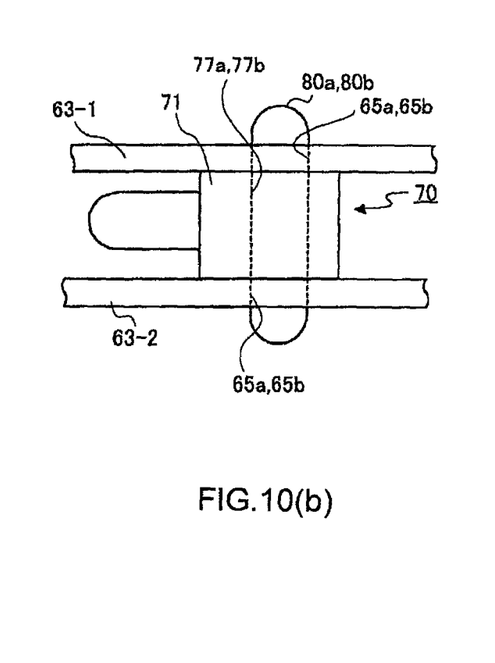

Next, coupling of the lens array 70 and the semiconductor substrates 63-1 and 63-2 will be described. FIG. 10A and FIG. 10B are diagrams of a state in which the lens array 70 and the semiconductor substrates 63-1 and 63-2 in FIG. 8 are coupled. FIG. 10A is a front view of the l lens array 70 and the semiconductor substrates 63-1 and 63-2. FIG. 10B is a right side surface view of the lens array 70 and the semiconductor substrates 63-1 and 63-2.

Through holes 65-1a and 65-1b are provided in the semiconductor substrate 63-1. Through holes 65-2a and 65-2b are provided in the semiconductor substrate 63-2. The inner diameters of the through holes 65-1a, 65-1b, 65-2a, and 65-2b are almost the same as the inner diameters of the attachment holes 77a and 77b. The distance between the through hole 65-1a and the through hole 65-1b, and between the through hole 65-2a and the through hole 65-2b are the same as the distance between the attachment hole 277a and the attachment hole 77b.

To couple the lens array 70 and the semiconductor substrates 63-1 and 63-2, first, the lens array main body 71 is placed on the semiconductor substrate 63-2, and the semiconductor substrate 63-1 is placed on the lens array main body 71. The positions of the attachment hole 77a and the through holes 65-1a and 65-2b, and the positions of the attachment hole 77b and the through holes 65-1b and 65-2a are aligned.

Then, metal pins 80a and 80b are respectively inserted into the attachment hole 77a and the through holes 65-1a and 65-2b, and the attachment hole 77b and the through holes 65-1b and 65-2a.

The outer diameters of the metal pins 80a and 80b are slightly larger than the inner diameters of the attachment holes 77a and 77b and the inner diameters of the through holes 65-1a, 65-1b, 65-2a, and 65-2b. Therefore, as a result of the metal pins 80a and 80b being inserted, the diameters of the attachment holes 77a and 77b, and the through holes 65-1a, 65-1b, 65-2a, and 65-2b become slightly enlarged. Frictional force is generated between the metal pins 80a and 80b, and the attachment holes 77a and 77b, and the through holes 65-1a, 65-1b, 65-2a, and 65-2b, thereby preventing the metal pins 80a and 80b from falling out. As a result, the lens array 70 is fixed to the semiconductor substrates 63-1 and 63-2.

Figure 11A:
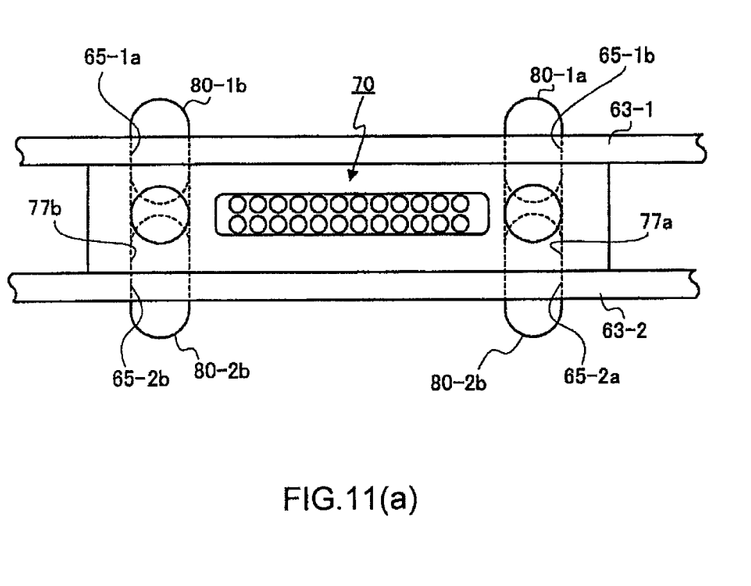
FIG. 11A and FIG. 11B are diagrams of a variation of the state in which the lens array and the semiconductor substrate in FIG. 8 are coupled.
Figure 11B:
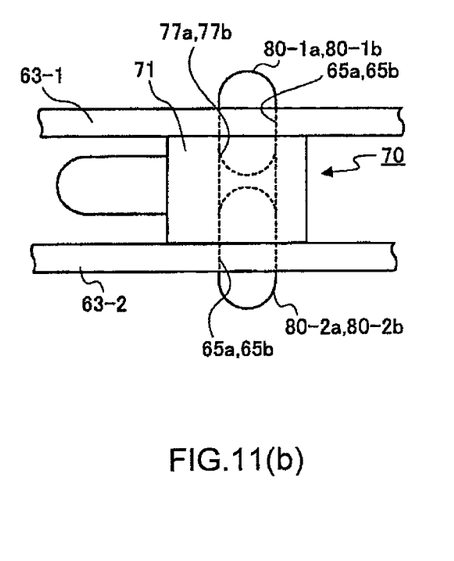

As shown in FIG. 11A and FIG. 11B, different metal pins may be used to couple the lens array 70 and the semiconductor substrate 63-1, and to couple the lens array 70 and the semiconductor substrate 63-2. In FIG. 11A and FIG. 11B, metal pins 80-1a and 80-1b are used to couple the lens array 70 and the semiconductor substrate 63-1, and metal pins 80-2a and 80-2b are used to couple the lens array 70 and the semiconductor substrate 63-2.

[Optical Path of Laser Beam]

The laser beam L1 emitted from each light-emitting element 11 enters the corresponding first lens 31 and is refracted by the first lens 31, thereby becoming parallel light. The laser beam L1 emitted from the first lens 31 is then reflected by the complete reflection surface 75a such as to change direction to an almost right angle in adherence to the angle of the complete reflection surface 75a. The laser beam L1 is then refracted by the corresponding second lens 32, thereby becoming converged light. The laser beam L1 emitted from the second lens 32 enters the end surface of the corresponding optical fiber 40a.

The laser beam L2 emitted from the end surface of each optical fiber 40b enters the corresponding third lens 33 and is refracted by the third lens 33, thereby becoming parallel light. The laser beam L2 emitted from the third lens 33 is then reflected by the complete reflection surface 75b such as to change direction to an almost right angle in adherence to the angle of the complete reflection surface 75b. The laser beam L2 is then refracted by the corresponding fourth lens 34, thereby becoming converged light. The laser beam L2 emitted from the fourth lens 34 enters the light-receiving surface of the corresponding light-receiving element 12. The optical axis of the laser beam L2 from the third lens 33 to the complete reflection surface 75b is almost parallel with the optical axis of the laser beam L1 from the complete reflection surface 75a to the second lens 32, and a constant distance is maintained therebetween. The optical axis of the laser beam L2 from the complete reflection surface 75b to the fourth lens 34 almost matches the optical axis of the laser beam L1 from the first lens 31 to the complete reflection surface 75a.

As described above, according to the second embodiment, the optical fibers and the photoelectric conversion elements (the light-emitting elements 11 and the light-receiving elements 12) are optically coupled by the lenses without the optical path of the laser beam L1 and the optical path of the laser beam L2 intersecting.

Effects and Variations according to the Second Embodiment

As described above, according to the second embodiment, because the optical path of the laser beam L1 and the optical path of the laser beam L2 do not intersect, multi-channel optical communication can be actualized with a connector in which a plurality of optical fibers are arranged in an array of two rows without causing interference or stray lights, using a compact configuration.

According to the second embodiment, the outer peripheral surface 71a of the lens array main body 71 that is in contact with the attachment surface 64-1 of the semiconductor substrate 63-1 and the outer peripheral surface 71c of the lens array main body 71 that is in contact with the attachment surface 64-2 of the semiconductor substrate 63-2 are parallel. Therefore, the semiconductor substrate 63-1 and the semiconductor substrate 63-2 can be fixed in a state in which a constant distance is maintained therebetween.

According to the second embodiment, the complete reflection surfaces 75a and 75b are angled, and the recess 75 is formed such that the cross-sectional area gradually decreases from the opening section towards the back. Therefore, the recess section 75 has a shape ensuring mold-release characteristics. As a result, the lens array 70 can be efficiently manufactured using a mold.

According to the second embodiment, the notched section 24 may be eliminated, the shape of the recess section 25 may be changed, and the complete reflection surface 24a may be formed into a surface configuring the recess section 25. In FIG. 5, a flat surface 25e connecting the surface 24c and the outer peripheral surface 21c, and a flat surface 25f connecting the transmittance surface 25a and the complete reflection surface 24a are formed in the recess section 25.

In the description above, an instance in which 12 of the 24 photoelectric conversion elements are light-emitting elements and 12 are light-receiving elements is described. However, the second embodiment is not limited thereto. For example, 12 light-emitting elements 11 may be disposed on each of the semiconductor substrates 63-1 and 63-2 that are both transmitting-side circuit boards, and a transmission-dedicated optical module 2 may be configured. Conversely, 12 light-receiving elements 12 may be disposed on each of the semiconductor substrates 63-1 and 63-2 that are both receiving-side circuit boards, and a reception-dedicated optical module 2 may be configured.

In the description above, an instance is described in which the attachment holes 77a and 77b are holes that pass through the lens array main body 71, and a single metal pin is inserted into each attachment hole 77a and 77b. However, the second embodiment is not limited thereto, and two metal pins may be used in each attachment hole 77a and 77b such that a metal pin is inserted into each end. In addition, according to the second embodiment, an attachment hole having a predetermined depth may be provided in each end section of the outer peripheral surfaces 71a and 71c. Notches may be provided instead of the attachment holes 77a and 77b. Furthermore, members having a projecting shape may be used instead of the metal pins.

INDUSTRIAL APPLICABILITY

The lens array and the optical module including the lens array of the present invention can be used in multi-channel optical communication.

The invention claimed is:

1. A lens array that optically couples 2×n number of photoelectric conversion elements (n being the number of photoelectric conversion elements per row and more than one) arrayed in two rows on a substrate and having an optical axis in a normal line direction of a surface of the substrate, and end surfaces of 2×n number of optical fibers arrayed in two rows and having an optical axis in a direction perpendicular to the optical axis of the photoelectric conversion elements, the lens array comprising:
- an n-number of first lenses provided in positions opposing the photoelectric conversion elements in a first row that is a row farther from the optical fibers;
- an n-number of second lenses provided in positions opposing the end surfaces of the optical fibers in a first row that is a row farther from the photoelectric conversion elements;
- an n-number of third lenses provided in positions opposing the photoelectric conversion elements in a second row that is a row closer to the optical fibers;
- an n-number of fourth lenses provided in positions opposing the end surfaces of the optical fibers in a second row that is a row closer to the photoelectric conversion elements;
- a first reflection surface that changes a traveling direction of light emitted from the photoelectric conversion elements in the first row or the end surfaces of the optical fibers in the first row and passing through a first optical path between the first lens and the second lens; and
- a second reflection surface that changes a traveling direction of light emitted from the photoelectric conversion elements in the second row or the end surfaces of the optical fibers in the second row and passing through a second optical path between the third lens and the fourth lens, wherein
- the first reflection surface is provided in a position that does not interfere with the second optical path, and
- the second reflection surface is provided in a position that does not interfere with the first optical path.

2. The lens array according to claim 1, wherein:
the second reflection surface is formed by a recess section, and
the recess section has a first transmittance surface and a second transmittance surface that transmits light passing through the first optical path.

3. The lens array according to claim 2, wherein the recess section has a cross-sectional area that gradually decreases from an opening section towards a back side.

4. The lens array according to claim 2, wherein the first transmittance surface and the second transmittance surface of the recess section are formed perpendicular to the first optical path.

5. A lens array that optically couples an n-number of photoelectric conversion elements (n being more than one) of a first row arrayed in a row on a first substrate and having an optical axis in a normal line direction of a surface of the first substrate, an n-number of photoelectric conversion elements of a second row arrayed in a row on a second substrate opposing the first substrate and having an optical axis in a normal line direction of a surface of the second substrate, and 2×n number of optical fibers arrayed in two rows and having an optical axis in a direction perpendicular to the optical axis of the photoelectric conversion elements, the lens array comprising:
- an n-number of first lenses provided in positions opposing the photoelectric conversion elements of the first row;
- an n-number of second lenses provided in positions opposing end surfaces of the optical fibers in a first row that is a row closer to the photoelectric conversion elements of the first row;
- an n-number of third lenses provided in positions opposing the photoelectric conversion elements of the second row;
- an n-number of fourth lenses provided in positions opposing end surfaces of the optical fibers in a second row that is a row closer to the photoelectric conversion elements of the second row;
- a first reflection surface that changes a traveling direction of light emitted from the photoelectric conversion elements of the first row or the end surfaces of the optical fibers in the first row and passing through a first optical path between the first lens and the second lens; and
- a second reflection surface that changes a traveling direction of light emitted from the photoelectric conversion elements of the second row or the end surfaces of the optical fibers in the second row and passing through a second optical path between the third lens and the fourth lens, wherein
- the first reflection surface is provided in a position that does not interfere with the second optical path, and
- the second reflection surface is provided in a position that does not interfere with the first optical path.

6. The lens array according to claim 5, wherein:
the first reflection surface and the second reflection surface are formed by recess sections; and
the recess section has a cross-sectional area that gradually decreases from an opening section towards a back side.

7. The lens array according to claim 5, wherein a first outer peripheral surface that is in contact with the first substrate during assembly and a second outer peripheral surface that is in contact with the second substrate during assembly are formed in parallel.

8. An optical module comprising:
2×n number of optical fibers;
a photoelectric conversion device that has 2×n number of photoelectric conversion elements arrayed in two rows on a substrate and having an optical axis in a normal line direction of a surface of the substrate, and converts optical signals to electrical signals or electrical signals to optical signals; and
a lens array according to any One of claims 1 to 4 that optically couples the photoelectric conversion elements and the optical fibers.

9. An optical module comprising:
2×n number of optical fibers;
a first photoelectric conversion device that has n-number of photoelectric conversion elements arrayed in a rows on a first substrate and having an optical axis in a normal line direction of a surface of the first substrate, and converts optical signals to electrical signals or electrical signals to optical signals;
a second photoelectric conversion device that has n-number of photoelectric conversion elements arrayed in a rows on a second substrate opposing the first substrate and having an optical axis in a normal line direction of a surface of the second substrate, and converts optical signals to electrical signals or electrical signals to optical signals; and
a lens array according to any one of claims 5 to 7 that optically couples the photoelectric conversion elements and the optical fibers.

* * * * *